US012783503B2

(12) United States Patent
Hu et al.

(10) Patent No.: US 12,783,503 B2
(45) **Date of Patent: *Nov. 3, 2026**

(54) CONTROL PLANE SERVICE OF A DISTRIBUTED CACHING PLATFORM

(71) Applicant: Stripe, LLC, South San Francisco, CA (US)

(72) Inventors: Yufei Hu, Foster City, CA (US); David Albertson, Bellevue, WA (US); Kexin Zhu, Santa Clara, CA (US)

(73) Assignee: Stripe, LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/209,049

(22) Filed: May 15, 2025

(65) Prior Publication Data

US 2025/0272278 A1 Aug. 28, 2025

Related U.S. Application Data

(63) Continuation of application No. 18/501,815, filed on Nov. 3, 2023, now Pat. No. 12,314,252.

(51) Int. Cl.

| | |
|---|---|
| ***G06F 16/23*** | (2019.01) |
| ***G06F 9/54*** | (2006.01) |
| ***G06F 16/2455*** | (2019.01) |
| ***G06F 16/27*** | (2019.01) |
| ***G06Q 10/0631*** | (2023.01) |

(52) U.S. Cl.

CPC .......... *G06F 16/2379* (2019.01); *G06F 9/547* (2013.01); *G06F 16/24552* (2019.01); *G06F 16/27* (2019.01); *G06Q 10/06313* (2013.01)

(58) Field of Classification Search

CPC . G06F 16/2379; G06F 16/27; G06F 16/24552

USPC .......................................................... 707/703

See application file for complete search history.

(56) References Cited

U.S. PATENT DOCUMENTS

| | | | | |
|---|---|---|---|---|
| 10,652,235 | B1 | 5/2020 | Mehta et al. | |
| 11,349,956 | B1 | 5/2022 | Cole | |
| 2013/0346260 | A1 | 12/2013 | Jubran et al. | |
| 2014/0047088 | A1 * | 2/2014 | Dain .................. | H04L 67/1097 709/223 |
| 2018/0300203 | A1 | 10/2018 | Kathpal et al. | |
| 2019/0332692 | A1 | 10/2019 | Rachapudi et al. | |
| 2020/0192781 | A1 | 6/2020 | Narayanaswamy et al. | |

(Continued)

OTHER PUBLICATIONS

Non-Final Office Action received for U.S. Appl. No. 18/501,815, mailed on Sep. 23, 2024, 6 pages.

(Continued)

*Primary Examiner* — Baoquoc N To

(74) *Attorney, Agent, or Firm* — BAKERHOSTETLER

(57) ABSTRACT

A method is disclosed for assessing the health of a cluster within a distributed data storage system. The method involves a first service receiving a request related to the health status of a cluster. The first service validates the received request. A second service transmits a message to the first service to obtain data associated with the cluster. The second service receives the requested data from the first service. Based on the received data and through communication with the cluster, the second service determines the health of the cluster.

20 Claims, 7 Drawing Sheets

(56) References Cited

U.S. PATENT DOCUMENTS

| | | | | |
|---|---|---|---|---|
| 2020/0394061 | A1 | 12/2020 | Sekar | |
| 2023/0051457 | A1* | 2/2023 | Gupta | G06F 11/3688 |

OTHER PUBLICATIONS

Notice of Allowance received for U.S. Appl. No. 18/501,815, mailed on Feb. 11, 2025, 9 pages.

* cited by examiner

CONTROL PLANE SERVICE OF A DISTRIBUTED CACHING PLATFORM

CROSS-REFERENCE TO RELATED APPLICATION

This application is a continuation of U.S. application Ser. No. 18/501,815, filed on Nov. 3, 2023, which is incorporated by reference herein in its entirety.

BACKGROUND

Service provider systems provide various services to user systems over computing networks. The services provided can include commercial transaction processing services, media access services, customer relationship management services, data management services, medical services, etc., as well as a combination of such services. Modern computing techniques employed by many service provider systems involve deploying the functions of the service provider systems as distributed services. With distributed services, each service may be responsible for a discreet set of functions, and the services and associated functions operate autonomously or in conjunction with one another as a whole to provide the overall functionality of a service provider system. By dividing the overall functionality of service provider systems, the services may be distributed to different computing systems. Multiple instances of the same services may be used concurrently, for example, to adapt to system load, reduce network connectivity issues, reduce instances of services going down. Additional technical challenges may be realized with implementing distributed service provider systems.

In service provider systems such as those described above, users may interact with the service provider system via transactions. For example, a user may make a transaction request for one of many types of transactions supported by the service provider system. Then, the one or more of the services of the distributed service provider system will perform functions of the service provider system to implement the originally requested transaction of the user. For example, the transaction may include a financial processing transaction, a media access transaction, a telecommunications transaction. The system may invoke one or more services of the service provider system to process a user's requested transaction.

During each of the operations performed by the service provider system during performance of a transaction, the services of the service provider system may generate and store, or seek to access stored, data associated with the service, the transaction, or other data. The data may include data associated with transaction bookkeeping purposes, record keeping purposes, regulatory requirements, end user data, service system data, third party system data, as well as other data that may be generated or accessed during the overall processing of the transaction. The service provider systems may perform millions, billions, or more transactions per hour, day, week, etc., resulting in an enormous scale of data generation and access operations of the services of the service provider system.

Given the quantity of transactions and complexity in facilitating each transaction and maintaining records, it may be beneficial for a service provider system to include an architecture that promotes data integrity while also being extensible and robust.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
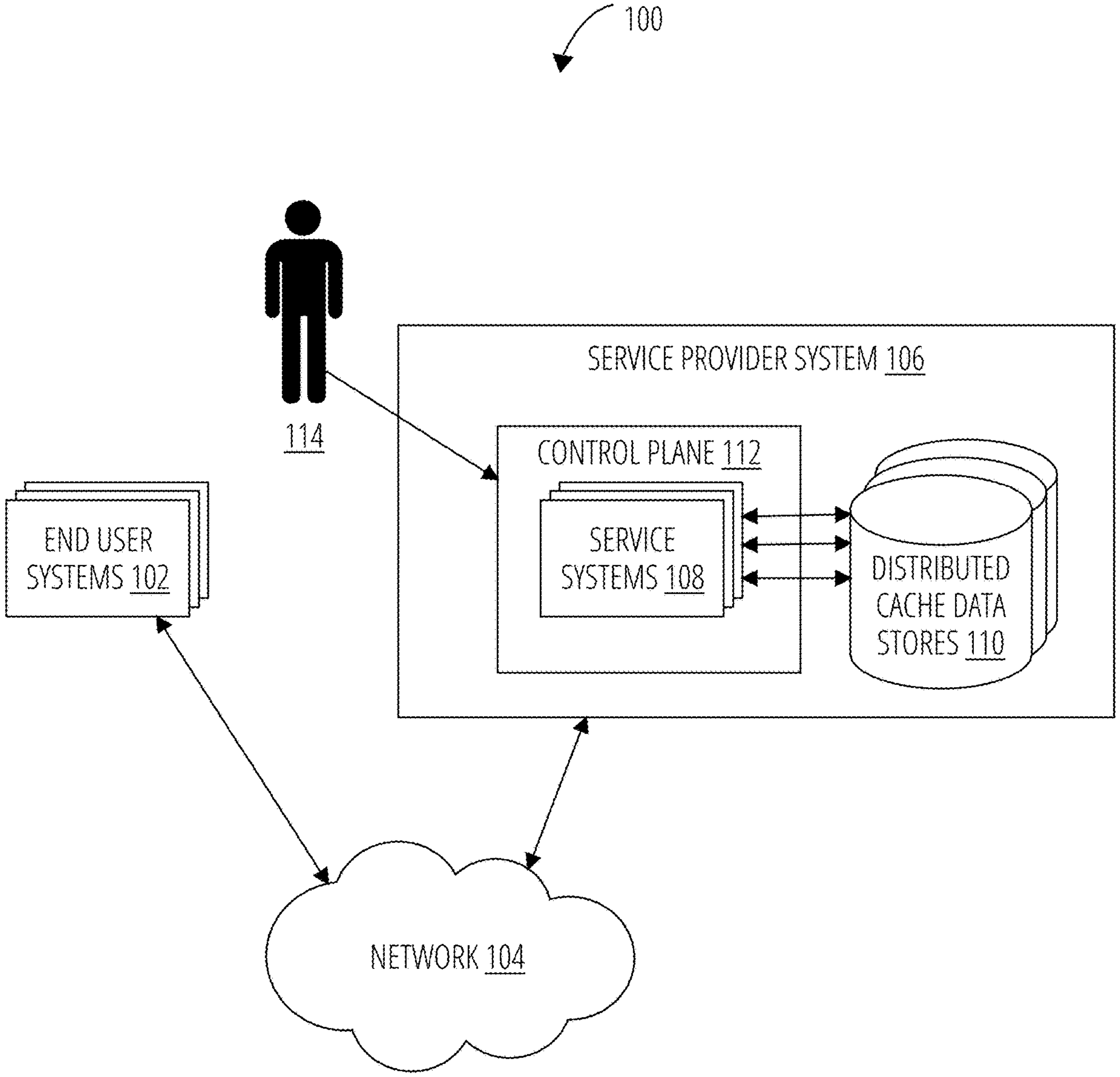
FIG. 1 is a block diagram of an exemplary system architecture for a service provider system for distributed data storage in accordance with an embodiment.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “updating”, “querying”, “storing”, “obtaining”, “instructing”, “loading”, “resuming”, “receiving”, “deleting”, “validating”, “calling”, “authorizing”, “validating”, “performing”, “communicating” or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture for a service provider system for distributed data storage. In one embodiment, the system architecture 100 includes service provider system 106 and one or more end user systems 102. In one embodiment, one or more of the end user system(s) may be mobile computing devices, such as a smartphone, tablet computer, smartwatch, etc., as well computer systems, such as a desktop computer system, laptop computer system, server computer systems, etc. The service provider system 106 and one or more of the end user systems 102 may also be one or more computing devices, such as one or more server computer systems, desktop computer systems, etc.

The embodiments discussed herein may be utilized by a plurality of different types of service provider systems, such as commerce platform systems including payment processing systems, card authorization systems, banks, and other systems seeking to perform zero downtime topology updates of distributed data stores, as discussed in greater detail below. Furthermore, the architectural system features described may be utilized for various applications, such as medical information systems, customer relationship management systems, media storage and distribution systems. However, to avoid obscuring the embodiments discussed herein, the operations and techniques of a distributed storage system may be described herein using examples of a commerce platform service provider system to illustrate and describe the embodiments of the present invention, and are not intended to limit the application of the operations and techniques described herein from applicability to other systems.

The service provider system 106 and end user systems 102 may be coupled to a network 104 and communicate with one another using any of the standard protocols for the exchange of information, including secure communication protocols. In one embodiment, one or more of the service provider system 106 and end user system 102 may run on one Local Area Network (LAN) (e.g., network 104) and may be incorporated into the same physical or logical system, or different physical or logical systems. Alternatively, the service provider system 106 and end user system 102 may reside on network 104 which may include different LANs, wide area networks, cellular telephone networks, etc. that may be coupled together via the Internet but separated by firewalls, routers, and/or other network devices. In one embodiment, service provider system 106 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, service provider system 106 provides financial processing services to one or more merchants, such as end user systems 102. For example, service provider system 106 may manage merchant accounts held at the commerce platform, run financial transactions initiated at end user systems 102, clear transactions, performing payouts to merchant and/or merchant agents, manage merchant and/or agent accounts held at the service provider system 106, as well as other services typically associated with commerce platforms systems such as, for example, STRIPE™. Each of these functions may be carried out by one or more service systems 108 of the service provider system 106. That is, service provider system 106 divides the services it provides to end user among one or more service systems 108 so that the processing of the services may be distributed. Such distribution of service processing enables service provider systems to scale based on load, demand, hardware issues, geographic needs, expanded service offerings, as well as for other reasons.

In embodiments, end user systems 102 access the services of service provider system 106 by network based messaging, such as application programming interface (API) based messaging where remote calls of end user system(s) 102 request a service by messaging the request to one or more of the service systems 108. The service systems 108 in turn, and in order to execute the requested service, may generate messages to other service systems 108, generate data associated with the requested service that is stored in one or more distributed cache data stores 110, access data stored in the distributed cache data stores 110 that is needed to process the requested service, or a combination of such operations. Thus, each requested service operation generates, stores, accesses, write, deletes, modified, or otherwise interacts with data stored at the distributed cache data stores 110. Furthermore, such data may originate from the end user systems 102 (e.g., user supplied data) and/or may be data associated with a requested service that is generated by a service system 108 (e.g., service generated/supplied data).

Service provider system 106 provides numerous services to end user systems 102. For example, where service provider system is a commerce platform, the services may include running financial transactions for merchant end users, managing agent accounts of merchants, performing tax accounting services as a result of the various financial transactions, performing data control and management of merchant data, providing platform hosting services, as well as any other such services. Each of these services 108 may be initiated at the request of an end user system 102, by another service 108, or a combination thereof. Furthermore, an end user system 102 may include a plurality of end user systems(s) that as a whole invoke the service systems 108 on the scale of millions, hundreds of millions, billions, or more service transactions per hour, day, etc. Therefore, the amount of data generated by the service systems 108 may be very large, and the number of data accesses by the service systems 108 is also very large. Because of this scale, in embodiments, service provider system 106 employs a distributed data storage system that utilizes in-memory cache data, illustrated as distributed cache data stores 110.

In embodiments, distributed cache data stores 110 is cache memory of a distributed data storage system, such as the Memento™ data storage system. The distributed cache data store(s) 110 are cache storage where data accesses (e.g., data being generated and stored, read, overwritten, etc.) are processed from the distributed cache data stores 110. In some embodiments, the distributed cache is a pool of random access memory (RAM) of multiple physical resources (e.g., computing systems that implement the service systems 108) that serves as an in-memory data store to provide fast access to the data stored within the distributed cache data stores 110. Furthermore, the use of a cache data storage system reduces network bandwidth consumption, as data accesses are performed directly with cache memory, and not as calls/responses to/from remote database systems. For systems, such as service provider system 106 that operates at scale, the use of distributed cache data stores 110 to manage data accessed by the service systems 108 is therefore both beneficial to end user systems 102 and service systems 108 as data access requests may be handled more quickly and use less network bandwidth.

As will be discussed in greater detail below, the volume of data stored by distributed cache data stores 110 and the scale of data accesses by the service systems 108 requires a current and accurate topology of the distributed cache data stores 110. The topology, as discussed below, includes a storage configuration that enable routers to determine where data is stored among distributed cache data stores 110.

Data access requests made against old or outdate topologies may delay services of the distributed service provider system 106 (e.g., when a requested service is delayed and/or rejected), cause data inconsistencies (e.g., where a data access is executed against an old or inaccurate topology), and otherwise harm the operations of the service provider system 110.

A control plane 112 may serve to manage cluster operations within the distributed cache data stores 110 while also serving as an interface layer that validates each request from service systems 108 and maintains inventory and relationships between components of the distributed cache data stores 110. For example, a user 114 may interface with control plane 112 to perform provisioning, de-provisioning, scaling, recycling, or health monitoring of the distributed cache data stores 110.

Embodiments described with respect to control plane 112 may address the challenge of efficiently managing a rapidly growing distributed caching fleet which may include thousands of stateless router nodes and stateful data nodes across different environments and regions within an organization. The control plane 112 may streamline the processes of provisioning and de-provisioning router and data node clusters, horizontal and vertical scaling of router and data node clusters, recycling router and data node clusters, and health monitoring of the router and data node clusters.

Control plane 112 may manage distributed cache stores 110 in an efficient manner that maintains data integrity of the distributed cache data stores 110. Service systems 108 may include a first service and a second service that each perform respective processes. The first service may receive a request (e.g., from user 114) to perform an operation associated with a cluster of nodes of the distributed cache data stores 110. The cluster may include one or more router nodes and one or more data storage nodes that are associated with the one or more router nodes. The first service may validate the request and, in response to the request being validated, the second service may perform the requested operation associated with the cluster. To perform the requested operation, the second service may call on the first service to access an inventory database that stores an association between the one or more router nodes and the one or more data storage nodes. The second service may communicate the operation to a service of the one or more router nodes to act according to the operation.

Additionally, control plane 112 may provide automated primary zone failover, (e.g., from a first availability zone to a second availability zone), or automatically orchestrate the replacement of faulty cluster components (e.g., a faulty router node or data node), or automatically conduct data path synthetic tests. Operations that are said to be automatically performed may include operations performed by a processing device without input or a prompt from a human.

Figure 2:
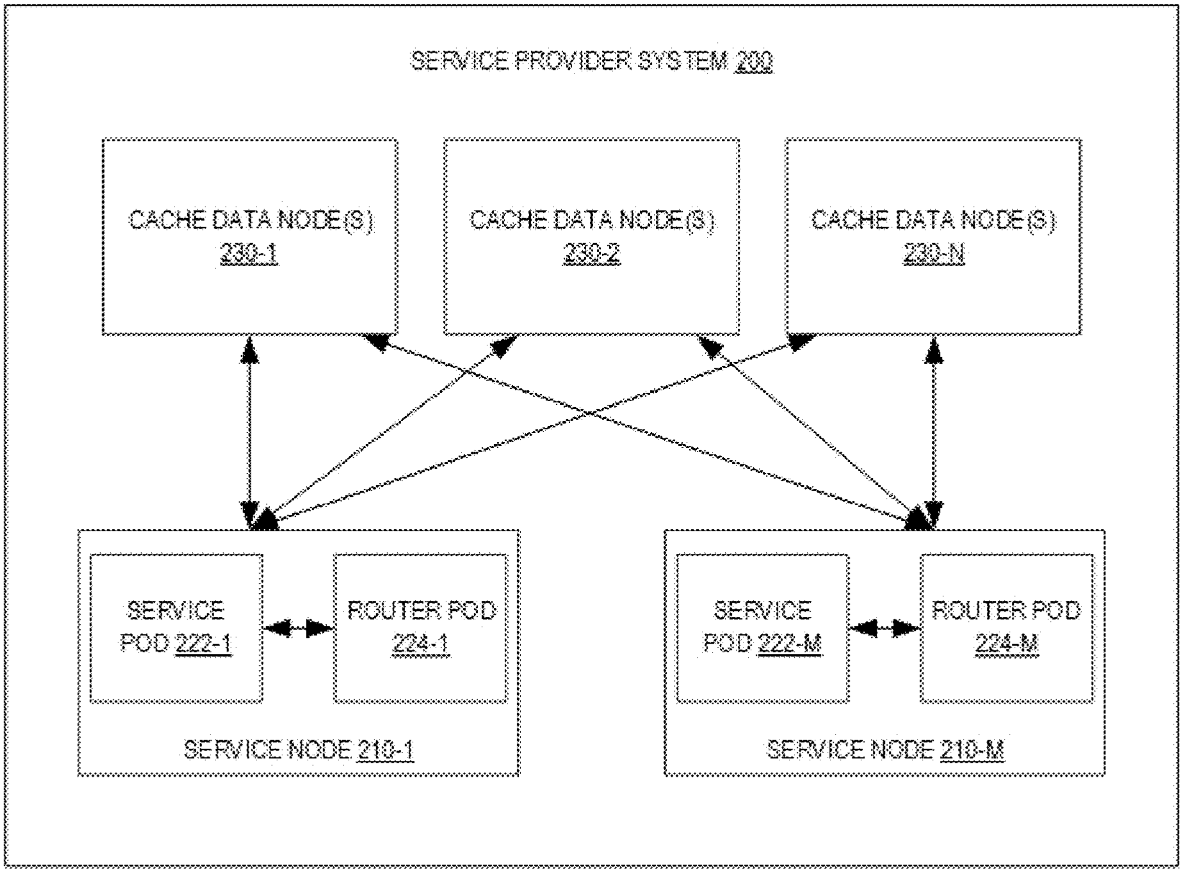
FIG. 2 is a block diagram of one embodiment of a service provider system architecture with services and routers for improving data access efficiency and reliability to distributed data cache nodes in accordance with an embodiment.

FIG. 2 is a block diagram of one embodiment of a service provider system architecture 200 with services and routers implemented in the same node for improving data access efficiency and reliability to distributed data cache nodes. Service provider system 200 provides additional details for the service provider system 110 discussed above in FIG. 1.

In an embodiment, service provider system 200 includes a plurality of services and routers each executed within respective service nodes, such as service nodes 210-1 through 210-M. Each service node 210 is a physical machine, or virtual machine executed by a physical machine, having its own computing system hardware, such as one or more processors, memories, network interfaces, and other hardware typically associated with network enabled computing devices. In an embodiment, each service node 210 includes at least one service pod (e.g., service pod 221-1 in node 210-1 through service pod 221-M in node 210-M) and at least one router pod (e.g., router pod 224-1 in node 210-1 through router pod 224-M in node 210-M). Each service pod may include one or more containers that each host an application, which enable service data access request processing and data access request routing to be carried out within the respective service node. Some components described with respect to FIG. 2 may correspond to components described in other figures. For example, each service node 210 may correspond to a router node (e.g., 328, 332, 336) as discussed in FIG. 3, and each cache data node 230 may correspond to a data node (e.g., 330, 334, 338) of FIG. 3.

The service and router applications within the pods, in embodiments, are performed by processing logic that may comprise hardware (circuitry, dedicated logic, etc.), software (such as is run on a general purpose computer system or a dedicated machine), firmware, or a combination. In embodiments, the pods discussed herein may be Kubernetes™ pods, and the pods and containers encapsulating the application therein are replicatable to pods on other virtual machines and/or nodes enabling scaling of the architecture herein to meet current processing needs, redundancy needs, geographical distribution needs, etc.

The cache data nodes 230-1, 230-2, through 230-N are nodes of in-memory RAM of the physical resources used to implement the services, routers, etc. of a service provider system, and are part of one or more computing centers (e.g., web services computing systems, cloud computing systems, etc., such as AMAZON WEB SERVICES™ (AWS), GOOGLE CLOUD™, IBM CLOUD™, MICROSOFT AZURE™, etc.) at which the services and routers are implemented, etc. Furthermore, in embodiments, the cache data nodes 230 may further include logic to respond to and execute data access requests, for example carrying out data access operation and replying to the services originating the requests.

As illustrated in FIG. 2, a service pod is within the same service node as a router pod. Thus, any data access request generated by a service application within a service pod may be sent to a router application within the router pod of the same service node. This means that the data access request is processed within the same machine (e.g., in-memory request handling), and the request is not transmitted over a network. Typically, different machines host service processing applications, router applications, and cache data node applications. Thus, a data access request would typically incur the latency of three network hops, and each such hop introduces a potential point of messaging failure. As discussed herein, at scale, this results in a significant number of network hops incurred by the data access request messaging, which consumes a vast amount of network bandwidth and introduces a vast number of potential failure points in the processing of the data access requests.

In embodiments, the architecture of the service provider system 200 includes the service application (e.g., providing a service of the service provider system 200) and the router application (e.g., providing routing of data access request messages to an appropriate cache data node 230) within respective pods on the same node (e.g., service pod 222-1 and router pod 224-1 on node 210-1). Beneficially, any data access request generated by the service application within service pod 222-1 is sent directly (e.g., within a single system as a call to a local host) to the router application within the router pod 224-1, which eliminates a network hop in the routing of a data access request. The router application within the router pod 224-1 then routes the data access request to the appropriate remote cache data node, which reduces the overall number of network hops by half. As a result, the presently discussed architecture and data access routing techniques significantly reduce bandwidth consumption while at the same time significantly increase reliability. Additionally, by reducing the number of network hops, data access latency is also significantly reduced, thereby improving the speed and efficiency by which data accesses are processed in a distributed storage system. As discussed herein, in modern distributed service provider systems that process hundreds of thousands, millions, billings of data access requests per minute, hour, day, etc., the resulting efficiency, reliability, and latency improvements greatly improve the data access architecture and data access processes carried out within the architecture.

Figure 3:
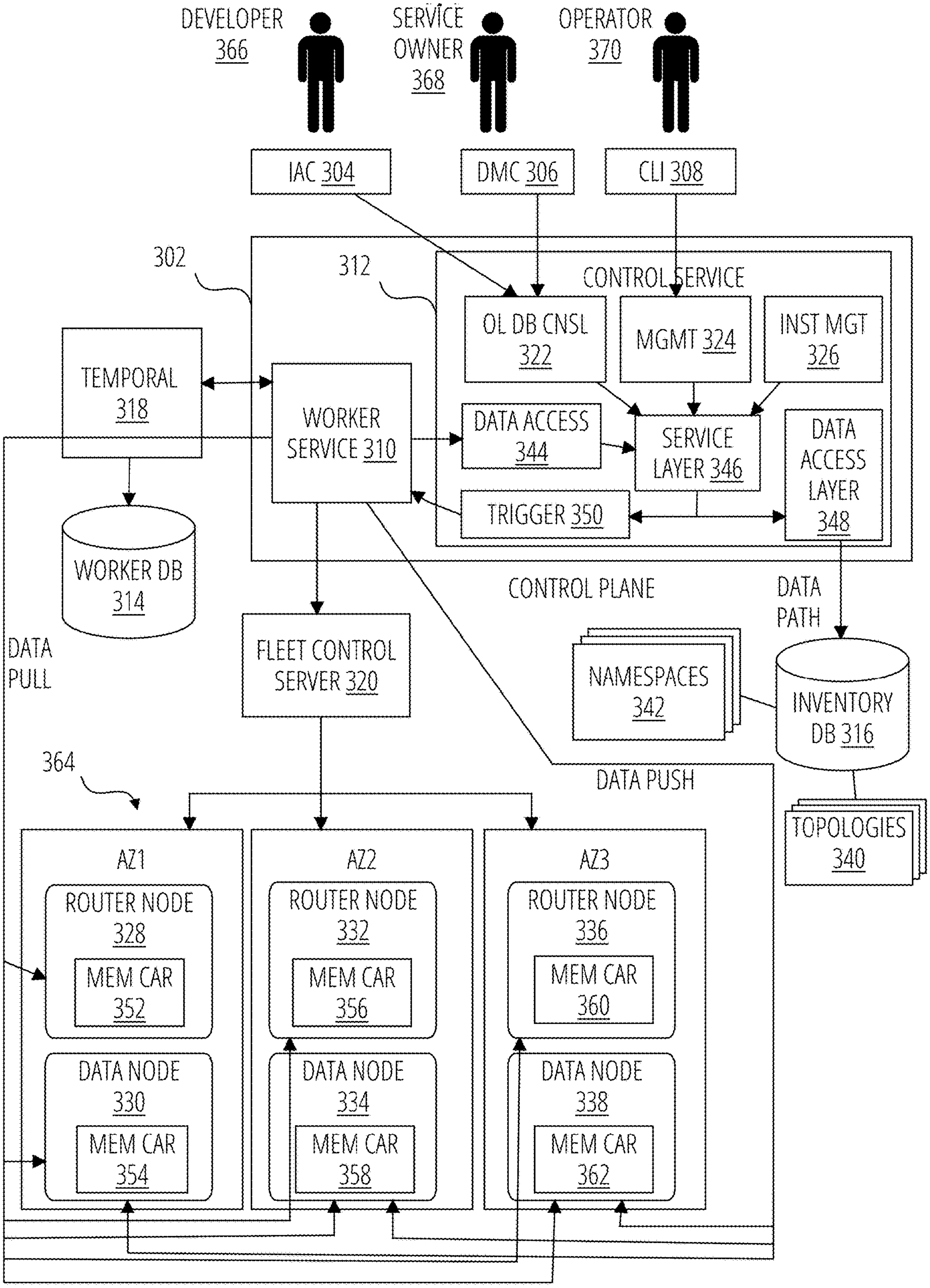
FIG. 3 shows an example control plane for managing a distributed cache store, according to an embodiment.

The service provider system 200 may be implemented with a dual service architecture that includes a control service (e.g., control service 312) and a worker service (e.g., worker service 310), as described with respect to FIG. 3. In an embodiment, service node 210 and service pods 222 may be performed by a control plane as described in other sections.

FIG. 3 shows an example control plane 302 for managing a distributed cache store, according to an embodiment. A regionally-distributed control plane 302 is shown for a distributed caching platform that stores and retrieves data from cache store 364 and performs provisioning, de-provisioning, health checking, or topology changes for each cluster in the cache store 364. Control plane 302 is an example embodiment of a control plane 112. The control plane 302, which may also be referred to as a control plane service, may utilize Kubernetes containers (to implement data cache 364) and Temporal workflows to manage operations for the distributed caching platform.

Control plane 302 may service requests from users (366, 368, 370) to operate create, read, update, or delete (CRUD) operations on the distributed cache data store 364. Control plane 302 may provision new caching clusters, individual components of the caching infrastructure (a router node or data node), perform updates or upgrades on already deployed infrastructure, deprovision clusters or individual components, or trigger caching related operations, for example, router reconfiguration, cache warming, node replacement, scaling up, or scaling down of a cluster.

The architecture of control plane 302 provides that a single regional outage at one control plane does not impact other control plane services at other regions. For example, each control plane service 302 may be deployed to a region, and isolated and backed by its own regional database cluster. Thus, if the control plane deployed to one region becomes inoperative (e.g., due to failure or maintenance), the other control planes in other regions may continue to operate as configured. Such a solution provides encapsulation of the control plane functionality, with an architecture that maintains data integrity of the distributed cache data store for a given region. Further, control plane 302 maintains separability from one region to another, to decouple possible failure scenarios between the regions (e.g., failure of one region does not result failure of a second region).

The control plane 302 may serve as an access and management layer for distributed cache data stores 364 formed from the database clusters. Each cluster may include one or more routers nodes (328, 332, 336) which are associated with one or more data nodes (330, 334, 338). The router nodes may be referred to as stateless router nodes. The data nodes may be referred to as stateful data nodes or stateful memento nodes.

A stateless router may use static routes that are configured ahead of time (e.g., pre-configured) as opposed to dynamic configuration. Stateless routers do not maintain state. Stateless routers may include processing logic (e.g., software and/or hardware) that forward packets over the network to the proper destination. They may send a request to the server and relay the response back without storing any information. Stateful refers to maintaining context about the current state or past operations associated with the respective cluster while stateless refers to being agnostic about a current state or past operations of the cluster.

A router node in a cluster (e.g., router node 328) may correspond to one or more service nodes (e.g., 210), and a data node in the cluster (e.g., data node 330) may correspond to one or more cache data nodes (e.g., 230). A single cluster may have one or more router nodes that are associated with one or more data nodes with a given topology. The number of router nodes and data nodes and the associations between them (e.g., the topology of the cluster) may vary depending on the application and requirements of a given customer.

The control plane service 302 may use an inventory database 316 (e.g., AWS Aurora PostgreSQL) for persistent storage. A database cluster may be formed from a cluster of one or more data nodes and one or more routers. Each router (e.g., 328, 332, 336) may represent one or more routers. Similarly, each data node (e.g., 330, 334, 338) may represent one or more data nodes. A database cluster may comprise one or more routers and the one or more data nodes associated with those one or more routers. For example, one or more router nodes 328 and one or more data nodes 330 may form a first database cluster, and one or more router nodes 332 and one or more data nodes 334 may form a second database cluster, and so on. Collectively, the database clusters may be referred to as a distributed cache data store 364, which may correspond to distributed cache data stores 110.

Each database cluster may operate in primary-secondary mode across three availability zones (AZs) to withstand up to two zone outages. For example, a first database cluster (328, 330) may operate in 'Availability Zone 1', a second database cluster (332, 334) may operate in 'Availability Zone 2', and a third database cluster (336, 338) may operate in 'Availability Zone 3'. Availability zone 1 may be the primary mode, while cluster B and cluster C operate in secondary modes (e.g., as backups). Thus, in the case that AZ1 goes down (e.g., due to a power failure, maintenance, or other reason), AZ2 or AZ3 may serve as backup so that the end user does not experience a downtime. Each AZ may be an AWS AZ data center or sets of data centers within an AWS Region. Each AZ operates independently, so a failure in one does not affect others. AZs may also provide low-latency network connectivity to other AZs in the same AWS Region.

Control plane service 302 may serve as an interface to users (e.g., developer 366, service owner 368, or operator 370) to seamlessly perform cluster operations. A cluster may be referred to as a grouping of one or more router nodes and one or more data nodes that serve as a distributed cache memory for a customer. For example, one or more router nodes 328 and one or more data nodes 330 may form a cluster. One or more router nodes 332 and one or more data nodes 334 may form a second cluster, and so on. Clusters may be duplicated in additional availability zones to provide redundancy for the customer.

Control plane service 302 may receive and service requests from one of the users. The requests may include one or more of: to perform horizontal or vertical scaling of a cluster (e.g., to add or remove router/data node), to recycle any of the clusters, to perform health monitoring of clusters, to automate primary zone failover, to perform synthetic data path testing, to perform data path integration testing, to update cluster configurations (e.g., topologies between router nodes and data nodes), to perform recycling, or other cluster operations.

The control plane 302 includes two main components: control service 312 (which may be referred to also as memento-control-srv) and worker service 310. Each service may include its own dedicated set of compute resources (e.g., processing threads, memory, etc.). Control plane 302 may be deployable as a package (e.g., a software package) to a particular region.

The control plane 302, including the control service 312 and worker service 310, as well as the inventory database 316, may be manage a plurality of clusters (e.g., a first cluster formed from 328 and 330, a second cluster formed from 332 and 334, and a third cluster formed from 336 and 338). Control service 312 is a stateless frontend service that manages read-write database access (e.g., all read-write database accesses), hosts internal and external gRPC (remote procedure call) endpoints. For example, API endpoints exposed by control service 312 may include an online database console 322 endpoint, a management 324 endpoint, and an instance management 326 endpoint. Control service 312 may receive a request from a developer 366 operating an infrastructure as code 304 (IAC) node, or a service owner 368 operating a database management console 306 (DMC), or an operator 370 operating a control cli 308 node.

Control service 312 may validate each request. The control service 312 may authorize the request based on the application programming interface (API) that is invoked through the request, and validate the operation in view of one or more constraints. For example, each API may check parameters of the request (e.g., the requester identity or credentials, the size or magnitude of the provisioning or deprovisioning request, the topology requested, etc.) against one or more constraints (e.g., authorized parties that may perform such an operation, size requirements for a given cluster, scaling requirements, etc.). The one or more constraints may, in some examples, be associated with a given namespace of namespaces 342. Each of namespaces 342 may have its own dedicated set of constraints. Service layer 346 may include business logic to validate requests from users and pass the request to trigger 350, as well as validating data access requests from worker service 310 and passing these along to data access layer 348.

In response to validating the request, control service 312 may trigger, at block 350, worker service 310 to help execute the operation. Worker service 310 (which may be referred to as a memento-temporal-worker-srv) may be a backend service that uses Temporal workflows to asynchronously execute heavy-lifting long-running workflows. Once triggered, worker service 310 may perform the operation associated with the cluster based on the request received. Worker service 310 may implement workflows to perform the requested operation on the cluster. The workflows perform operations that interface with and manage the distributed cache data store 364. Additionally, or alternatively, worker service 310 may communicate with fleet control server 320 to scale, provision (e.g., add a new) or deprovision (e.g., remove) a cluster.

For example, worker service 310 may communicate with temporal workflow manager 318 which utilizes a worker database 314 to manage and dispatch one or more workflows to perform a given operation. Worker service 310 may schedule a workflow to execute the operation (as requested through IAC 304, DMC 306, or CLI 308), and monitor execution of the operation until completion. For example, a temporal workflow may be deployed to communicate with a respective memcar (e.g., 352, 354, 356, 358, 360, or 362) to carry out the provisioning, deprovisioning, health-checking, topology change, or other operation requested, and to monitor the completion of that operation within the cluster. Each memcar can be understood as a dedicated service that receives requests and performs the requested data node operation (e.g., a read, write, health check, etc.).

The worker service may call on the control service 312 (e.g., at data access block 344) to access an inventory database 316 to read or write about a cluster such as, for example, associations between the one or more router nodes (e.g., 328) and the one or more data storage nodes (e.g., 330). For example, the inventory database 316 may include the topology or topologies 340 of a cluster, a namespace 506 that is associated with a given cluster, or other information. With the existing information about the cluster that is obtained from the inventory database 316, the worker service 310 may deploy a worker service to communicate the operation (e.g., provisioning, deprovisioning, changing a topology, performing a health check, etc.) with a service of the one or more router nodes (e.g., memcar 352 or memcar 354) to perform and monitor the requested operation. The worker service 310 does not interact directly with the inventory database 316, but calls the control service 312 to do so, to maintain data integrity within the inventory database 316.

For example, memcar 352 or memcar 354 may be called upon by a workflow that is dispatched by worker service 310, to increase (e.g., provisioning) or decrease (e.g., deprovisioning) a number of the one or more router nodes or a number of the one or more data storage nodes for the cluster. In an embodiment, the scaling (e.g., the number of router nodes, number of data storage nodes, or ratio between them) may be increased or decreased based on a scaling requirement associated with a namespace (e.g., one of namespaces 342). The namespace may be included in the request, associated with a requestor, or associated with a merchant.

One or more namespaces 342 may be stored and managed (e.g., added, modified, updated, or deleted) in the inventory database 316. Each namespace may logically group one or more auto-scaling groups into a single group. Auto-scaling may refer to the control plane recycling, adding, removing, and/or replacing nodes automatically to maintain a threshold amount or ratio of nodes within a cluster.

The control service 312 may have sole access to inventory database 316 through data access layer 348, and thus, may have sole control in storing and managing the one or more namespaces 342.

In an example, memcar 352 or memcar 354 may be called upon (by a workflow enacted by worker service 310) to adjust the relationships between the one or more router nodes 328 and one or more data storage nodes 330, thereby changing the topology of the cluster. After the worker service 310 pushes data to each of the services, the worker service 310 may pull the data to obtain the updated number of router nodes, data storage nodes, or topology, or to obtain the health check results. The worker service 310 may push these results to the control service 312 through data access block 344, service layer 346, and data access layer 348, so that updates to each cluster are memorialized in inventory database 316.

The control service 312 may operate as a stateless frontend service that gates all database read-write access (e.g., from a developer operating infrastructure as code 304, or from a service owner operating database management console 306, or from an operator of a command line interface 308, and the worker service 310 may have access (e.g., sole access) to the one or more router nodes (e.g., 328, 332, 336) and the one or more data storage nodes (e.g., 330, 334, 338). The control service 312 may not have access to the one or more router nodes and the one or more data storage nodes. The arrangement and division of responsibilities between control service 312 and worker service 310 enables simplified and improved horizontal and vertical scaling of the control plane service, promoting resilience against sudden bursts of workload, particularly during high-traffic periods.

Control plane 302 may apply a distributed locking solution. In an example, the distributed locking may be performed on a namespace level (e.g., each namespace may have a dedicated distributed locking solution). The distributed locking solution may use serialized PostgreSQL transactions, which may prevent race conditions by coordinating concurrent workflows running against the same set of namespaces. This may eliminate data racing among different workflows by ensuring that only one write operation can happen to a cluster at any point in time. This may significantly reduce operational overhead and enhanced the predictability, stability, and safety of the control plane service as it manages a rapidly expanding fleet.

In an embodiment, control plane 302 may monitor the health of the distributed caching infrastructure by polling the status of each individual router node and data node at a given period (e.g., every minute, every two minutes, etc.). The acquired health signals may be transmitted and presented as metrics and used to orchestrate automated primary zone failover and the replacement of faulty router or data nodes. This may be critical in maintaining a high data path availability (e.g., 99.999%) of the distributed cache data store of the service provider system.

The control plane service 302 may manage the topologies of each cluster. A topology may define the association between a router cluster and a data node cluster (e.g., how each router node routes a data read/write to each data node). The control plane service may store and update topologies 340 in inventory database 316, so that the inventory database 316 accurately represents the current state of a given cluster. The control plane 302 has a record of the total deployed clusters (e.g., each data node and router node, and the cluster topology). Addressing information may also be stored by the control plane to allow communication between the control and deployed infrastructure. By dynamically changing the topologies in the fleets, control plane 302 ensures a high data path availability and resiliency under unsolicited hardware malfunctions.

Control plane 302 may implement a primary zone auto failover mechanism within the control plane service on top of the health monitoring and the topology management technology operations. For example, control plane 302 may designate AZ1 as a primary zone and automatically transition to AZ2 or AZ3 in response to a failure of AZ1.

Control plane 302 may perform cache warming to safely modify a stateful data node during scaling and recycling operations. Cache warming can be performed on either an entire cluster or individual nodes while preventing down time to the customers during the data movement process. Cache warming may include pre-filling the data nodes with data rather than waiting for data nodes to be filled through typical usage of end user systems.

Control plane 302 may provide high data path availability when performing a vertical or horizontal scaling of a cluster, or replacing individual malfunctioning nodes (e.g., one of data nodes 330 or router nodes 328). In an embodiment, control plane 302 may manage the come-and-go of any individual router node or data node.

An instance notification and termination workflow may be implemented by worker service 310 and temporal workflow manager 318. These workflows may perform data push and data pulls using a push model. Individual nodes may initiate an instance notification workflow during a bootstrapping phase and trigger an instance termination workflow during the termination phase. The control plane service 302 then modifies the inventory database 316 and orchestrates the bootstrapping or termination process. To ensure a smooth shutdown of a router node (e.g., 328, 332, 336) without causing any impacts to customers due to lost connections, the control plane 302 may first trigger a graceful shutdown of the routing process to drain all in-use connections before proceeding to the next step in the instance termination workflow.

To preempt data path related errors before they can affect customers, the control plane 302 may execute synthetic data path tests and data path integration tests periodically (e.g., every 'x' minutes). These tests may assess end-to-end availability of the data path (e.g., from cluster to end-user) in real-time. If a disturbance of the data path is detected during the testing, the failure may be instantaneously emitted (e.g., as a notification, an email, an SMS msg, etc.) to serve as early warnings to system operators, alerting an operator 370 of potential upcoming disruptions to customer activity. Such a test and notification process may enable early halting of a flawed service deployment before the flaw affects fleets across multiple regions.

Figure 4:
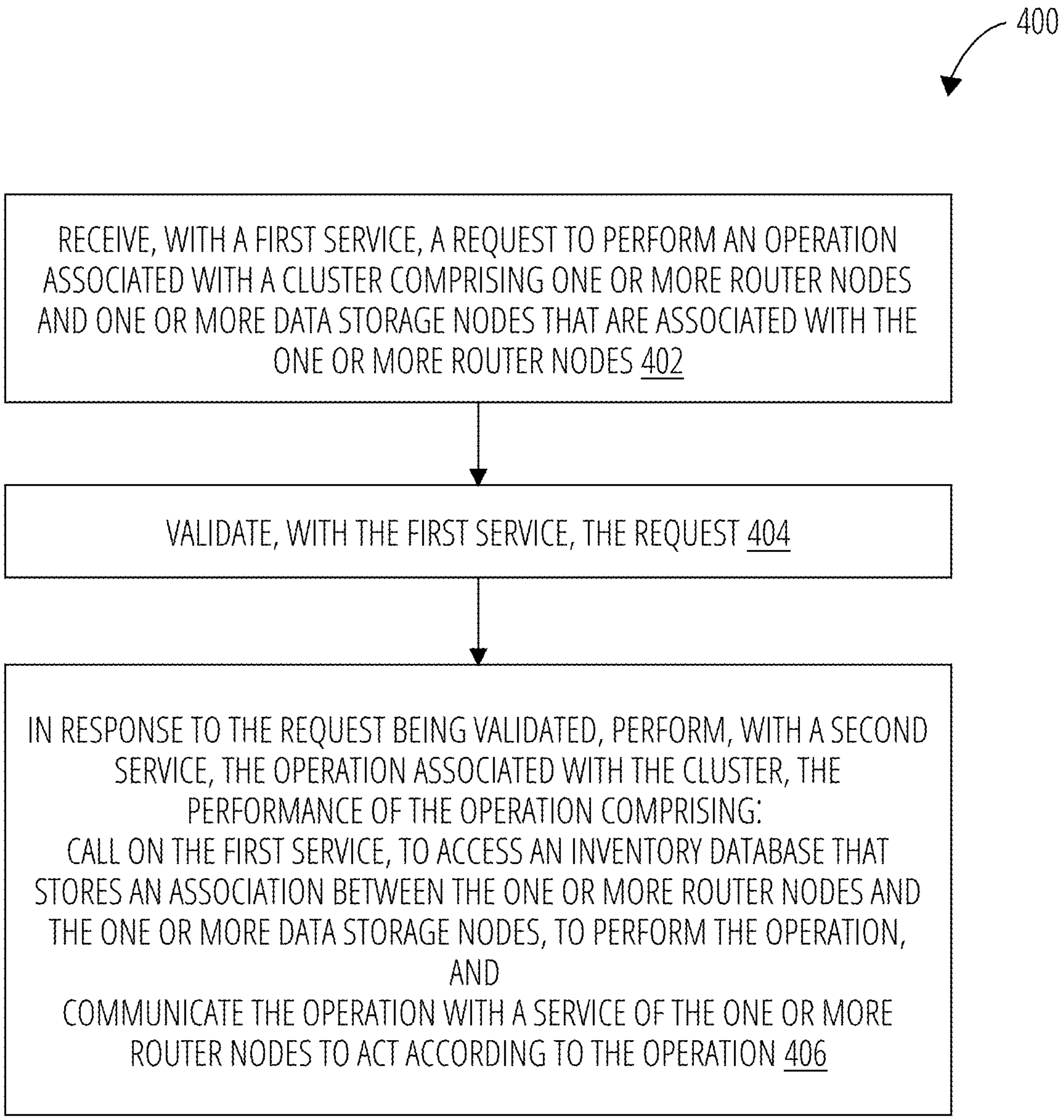
FIG. 4 illustrates a process for managing a distributed storage system with a control plane, in accordance with one embodiment.

FIG. 4 is a flow diagram of a process 400 for managing a distributed storage system with a control plane. The process 400 is performed by processing logic that may comprise hardware (circuitry, dedicated logic, etc.), software (such as is run on a general purpose computer system or a dedicated machine), firmware, or a combination. In one embodiment, the process 400 is performed by a control plane (e.g., control plane 112 or control plane 302) having a first service (e.g., control service 312) and second service (e.g., worker service 310).

At block 402, processing logic receives, with the first service, a request to perform an operation associated with a cluster of nodes, wherein the cluster includes one or more router nodes and one or more data storage nodes that are associated with the one or more router nodes. The request may be received through one of one or more application programming interface (API) endpoints of the first service (e.g., a gRPC endpoint). The operation may comprise a request to add one or more additional clusters, remove one or more clusters, change a topology of the cluster, return a health status of the cluster, recycle cluster components, or other operation.

At block 404, processing logic validates the request with the first service. In an example, validating the request comprises authorizing the request based on an API that is invoked through the request, and validating the operation in view of one or more constraints. The one or more constraints may be specific to a namespace associated with the request or the end user. The API may contain logic to compare the request against the one or more constraints. The one or more constraints may define which users may perform such an operation, or define health requirements for a cluster, or cluster size requirements, or other constraints associated with a given cluster. By interfacing with user requests through API endpoints and including business logic in the API endpoints, the control plane can be updated to add functionality or use cases by adding additional API endpoints, thereby providing extensibility.

At block 406, in response to the request being validated (e.g., by the first service), processing logic performs, with a second service, the operation associated with the cluster, the performing of the operation comprising: calling on the first service, to access an inventory database that stores an association between the one or more router nodes and the one or more data storage nodes, to perform the operation, and communicating the operation with a service of the one or more router nodes to act according to the operation. As described, the second service may implement workflows to communicate with the distributed cache data stores to perform the requested operation. In an embodiment, performing the operation (by the second service) may include increasing or decreasing a number of the one or more router nodes or the one or more data storage nodes for the cluster based on a scaling requirement associated with the namespace. Although the second service initiates the deployment of a workflow, workflows and other cluster operations may be supported by a service external to the control plane (e.g., a temporal service 318 or a fleet control server 320). Thus, functionality may be increased by increasing capacity of the external service, without modifying the control plane.

The first service may have sole communication with end users and sole access to the inventory database. The second service may have sole access to the distributed cache data stores (the one or more router nodes and the one or more data storage nodes). This may improve data integrity within the cluster as well as data integrity within the inventory database.

Figure 5:
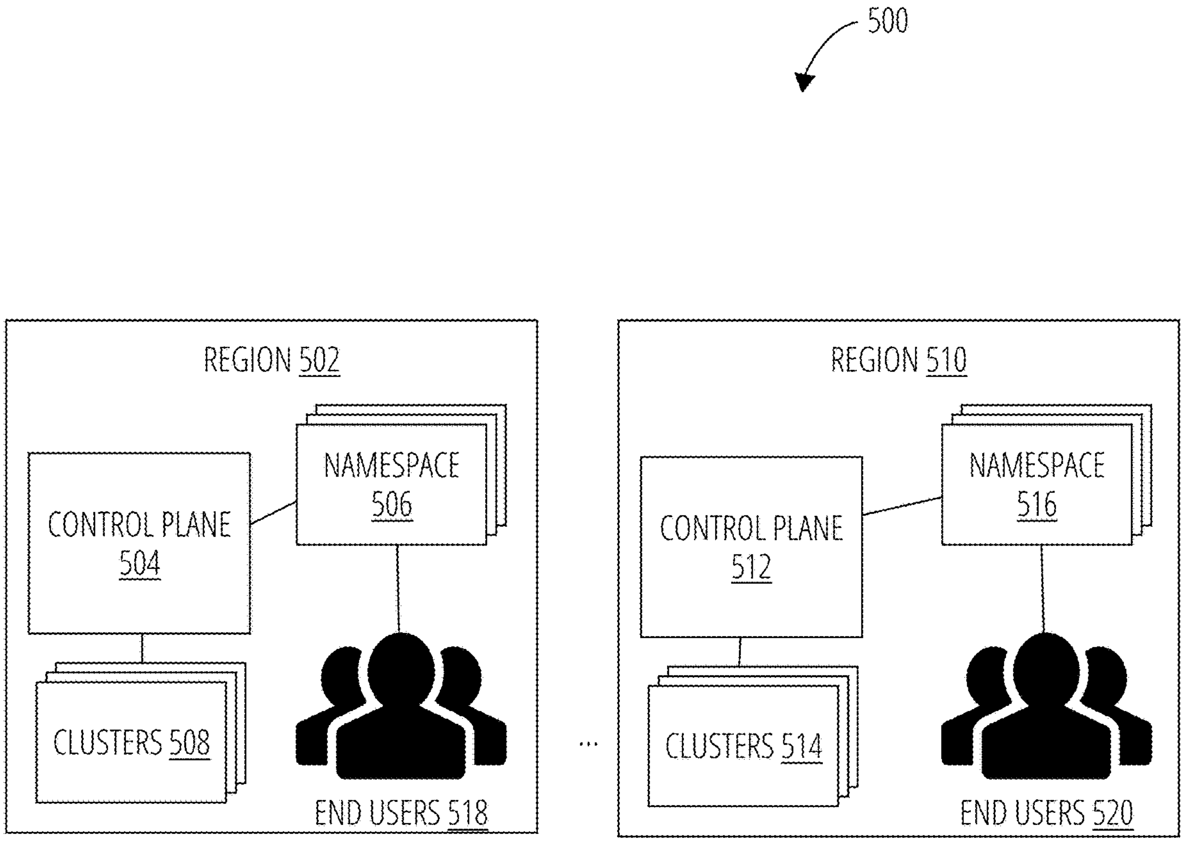
FIG. 5 shows an example illustration of control plane deployment and namespaces for managing a distributed data storage system in accordance with an embodiment.

FIG. 5 shows an example illustration of control plane deployment and namespaces for managing a distributed data storage system.

A service provider system 500 may cover a plurality of regions (e.g., 502, 510). In an embodiment, each region (e.g., 502, 510) may represent a different geographical area. Service provider system 500 may include a plurality of deployed control planes (e.g., control plane 504 and control plane 512). Each control plane (e.g., 504, 512) may be separately deployed to each region (e.g., region 502 and region 510) respectively. Each control plane may correspond to a control plane as described in other sections, and may include a first service (e.g., a control service) and a second service (e.g., a worker service), as described in other sections.

One or more namespaces (e.g., 506, 516) may be managed by each control plane (e.g., 504, 512) to manage respective one of clusters (508, 514) for a given one of end users (e.g., 518, 520). For example, 'namespace A' among namespaces 506 may correspond to a 'merchant A' among end users 518. Namespace A may define requirements (e.g., a scaling requirement or other requirements) for a respective one of clusters 508 that serves as a cache data store for 'merchant A'. Further, a single end user may have multiple duplicated clusters in different AZs (as described with respect to FIG. 3).

If control plane 504 becomes inoperative (e.g., unresponsive, slow, etc.), this may impact data storage for end users 518, but will not impact end users 520 because control plane 512 is decoupled from control plane 504. Service provider system 500 has separate deployed control planes so that failure or downtime in one region (e.g., 502) does not cause failure or downtime in another region (e.g., region 510).

Figure 6:
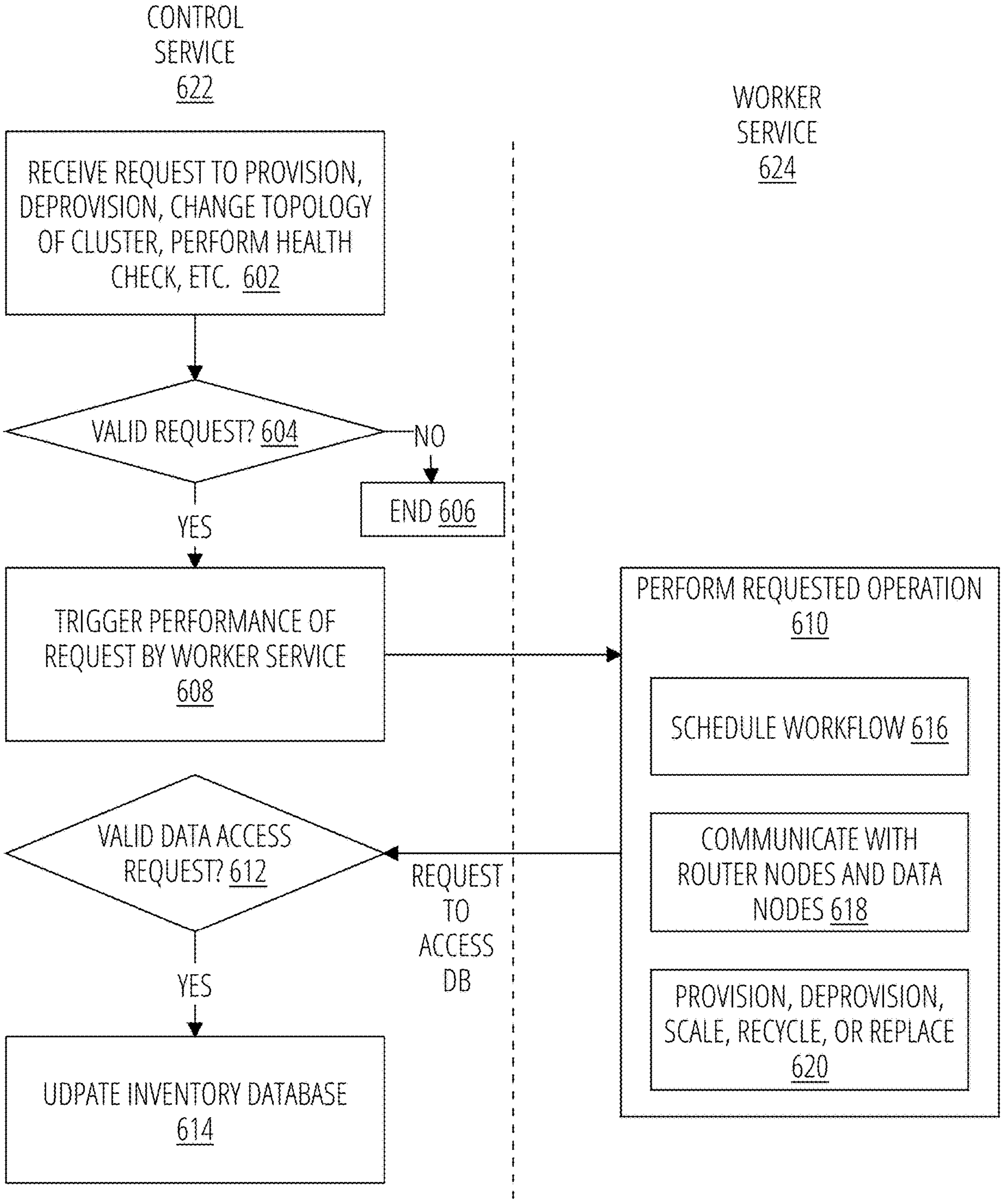
FIG. 6 shows a workflow for a processing device for managing a distributed storage system with a control plane, in accordance with an embodiment.

FIG. 6 shows a workflow for a processing device for managing a distributed storage system with a control plane. The workflow may be performed by a control plane (e.g., as described in other sections) that includes a control service 622 and a worker service 624. Control service 622 may interface with user requests and an inventory database. Worker service 624 may interface with the clusters (e.g., by deploying workflows to communicate with services of data nodes or router nodes) to perform the user requests.

At block 602, control service 622 may receive a request from a user to perform a cluster operation. Examples of a cluster operation include: a provisioning request (e.g., add nodes to a cluster or add a cluster), a deprovisioning request (e.g., remove nodes from a cluster or remove the cluster), changing a topology of the cluster, performing a health check of a cluster, or recycling cluster components, etc. The request may be received through an API (e.g., a gRPC endpoint) of the control service 622.

At block 604, control service 622 may check if the request is valid. This may include validating whether the provisioning, deprovisioning, or topology change request satisfies one or more conditions that are associated with the cluster (e.g., if the requester is authorized for a given request, or if scaling requirements of a cluster are satisfied). If the request is invalid, the control service 622 may proceed to block 606 and ignore the request.

At block 608, control service 622 may trigger the worker service 624 to perform the requested operation, in response to validating the request. For example, the control service 622 may send a message to worker service 624 to perform the requested operation for the cluster specified in the request.

At block 610, worker service 624 may perform the requested operation. Block 610 may include scheduling one or more workflows (e.g., temporal workflows) to perform the operation at block 616. Block 610 may include communicating with one or more router nodes and one or more data nodes (which may collectively be referred to as a cluster) to perform the requested operation at block 618. In an embodiment, a scheduled workflow may be deployed by the worker service 624 to communicate with a memcar of the router node or data node. At block 620, the workflow may communicate with services of a cluster (e.g., memcars) to perform the request (e.g., provisioning, deprovisioning, scaling, recycling, replacing, health checking, etc.). The scheduled workflow (from block 616) may monitor completion of the operation.

At block 612, worker service 624 may request an access to an inventory database. This may be a read or write access request, depending on the operation that the worker service 624 is to perform. This read or write access may be performed before and/or after the operation on the cluster is performed on the cluster (e.g., to determine what commands to give to the cluster and to update the information of that cluster after performance of the operation). If valid, the control service 622 may update the inventory database at block 614. If invalid, the control service 622 may deny the request to update the inventory database. Control service 622 may also create a log or notification in response to an invalid database access request.

Figure 7:
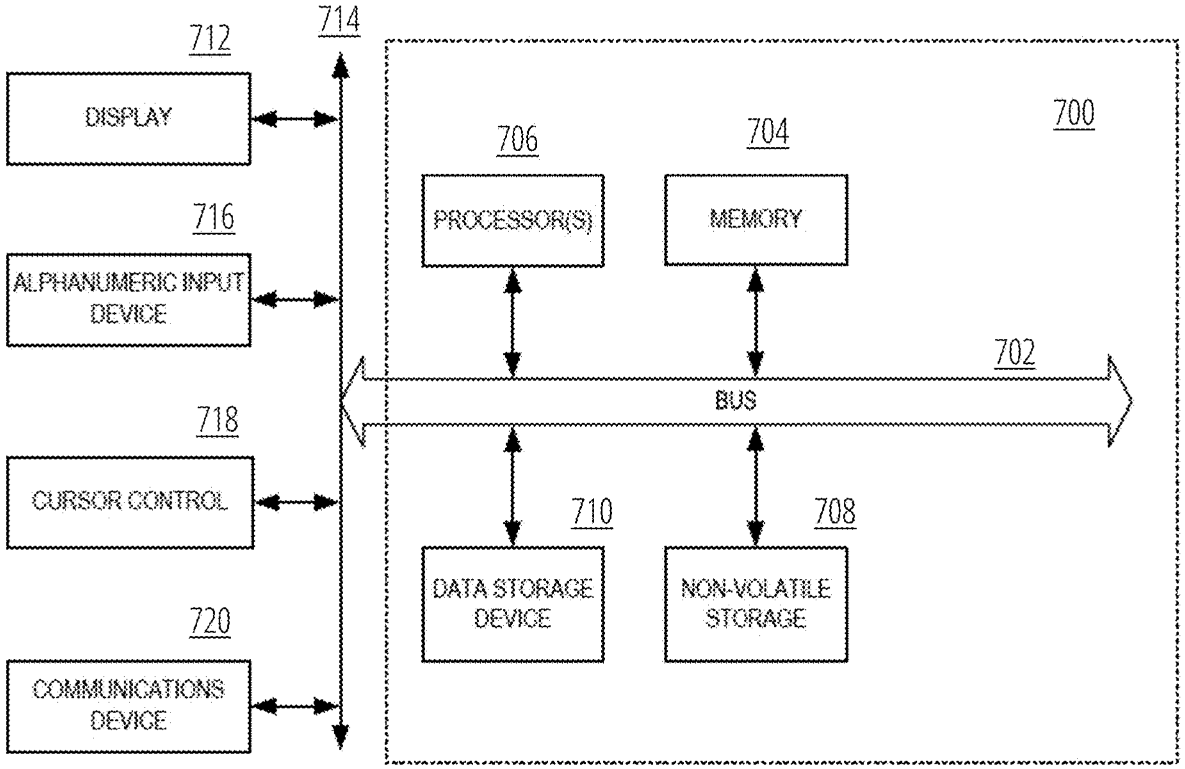
FIG. 7 is an example of a computer system that may be used to support the systems and operations discussed herein, in accordance with an embodiment.

FIG. 7 is one embodiment of a computer system that may be used to support the systems and operations discussed herein. For example, the computer system illustrated in FIG. 7 may be used by a commerce platform system, a merchant development system, merchant user system, etc. It will be apparent to those of ordinary skill in the art, however that other alternative systems of various system architectures may also be used.

The data processing system illustrated in FIG. 7 includes a bus or other internal communication means 702 for communicating information, and one or more processors 706 coupled to the bus 702 for processing information. The system further comprises a random access memory (RAM) or other volatile storage device 704 (referred to as memory), coupled to bus 702 for storing information and instructions to be executed by processor 706. Main memory 704 also may be used for storing temporary variables or other intermediate information during execution of instructions by processor 706. The system also comprises a read only memory (ROM) and/or static storage device 708 coupled to bus 702 for storing static information and instructions for processor 706, and a data storage device 710 such as a magnetic disk or optical disk and its corresponding disk drive. Data storage device 710 is coupled to bus 702 for storing information and instructions.

The system may further be coupled to a display device 712, such as a light emitting diode (LED) display or a liquid crystal display (LCD) coupled to bus 702 through bus 714 for displaying information to a computer user. An alphanumeric input device 716, including alphanumeric and other keys, may also be coupled to bus 702 through bus 714 for communicating information and command selections to processor 706. An additional user input device is cursor control device 718, such as a touchpad, mouse, a trackball, stylus, or cursor direction keys coupled to bus 702 through bus 714 for communicating direction information and command selections to processor 706, and for controlling cursor movement on display device 712.

Another device, which may optionally be coupled to computer system 700, is a communication device 720 for accessing other nodes of a distributed system via a network. The communication device 720 may include any of a number of commercially available networking peripheral devices such as those used for coupling to an Ethernet, token ring, Internet, or wide area network. The communication device 720 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 704, mass storage device 710, or other storage medium locally or remotely accessible to processor 706.

It will be apparent to those of ordinary skill in the art that the system, method, and process described herein can be implemented as software stored in main memory 704 or read only memory 708 and executed by processor 706. This control logic or software may also be resident on an article of manufacture comprising a computer readable medium having computer readable program code embodied therein and being readable by the mass storage device 710 and for causing the processor 706 to operate in accordance with the methods and teachings herein.

The embodiments discussed herein may also be embodied in a handheld or portable device containing a subset of the computer hardware components described above. For example, the handheld device may be configured to contain only the bus 702, the processor 706, and memory 704 and/or 710. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 706, a data storage device 710, a bus 702, and memory 704, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated

What is claimed is:

1. A method performed by a processing device, comprising:

receiving, by a first service of a distributed data storage system, a request associated with a health of a cluster that comprises one or more router nodes and one or more data storage nodes;

validating, by the first service, the request;

transmitting, by a second service of the distributed data storage system, a message to the first service to obtain data that is associated with the one or more router nodes and the one or more data storage nodes;

receiving, by the second service, the data from the first service, wherein the second service obtains the data by the first service accessing an inventory database that stores an association between the one or more router nodes and the one or more data storage nodes;

determining, by the second service, the health of the cluster based on the data and based on communicating directly with a service of the one or more router nodes; and in response to a determination that the health of the cluster indicates that at least one of the one or more router nodes or one or more data storage nodes is faulty, causing, by the second service, a modification to at least one of: a topology of the cluster, an operational state of one or more router nodes or data storage nodes, or transitioning the cluster to a failure zone.

2. The method of claim 1, wherein the data comprises a health constraint that is associated with the cluster, a topology that is associated with the cluster, a cluster size constraint, or a namespace that is associated with the cluster.

3. The method of claim 1, wherein determining the health of the cluster comprises receiving a communication from the service of the one or more router nodes indicating that the cluster comprises a faulty router node.

4. The method of claim 1, wherein determining the health of the cluster comprises receiving a communication from the service of the one or more router nodes indicating that the cluster comprises a faulty data node.

5. The method of claim 1, further comprising transmitting, by the second service, the health of the cluster to the first service, wherein in response to receiving the health of the cluster, the first service updates a database comprising the data that is associated with the cluster, with the health of the cluster.

6. The method of claim 1, wherein causing the modification comprises transitioning the cluster to the failure zone.

7. The method of claim 1, further comprising, in response to a determination that the health of the cluster indicates that at least one of the one or more router nodes or one or more data storage nodes is faulty, designating a new failure zone for the cluster.

8. The method of claim 1, wherein causing the modification comprises replacing the at least one of the one or more router nodes or one or more data storage nodes that is faulty.

9. A distributed data storage system comprising memory having instructions stored thereupon, and one or more processors configured to execute the instructions, causing the distributed data storage system to perform operations comprising:

receiving, by a first service of the distributed data storage system, a request associated with a health of a cluster that comprises one or more router nodes and one or more data storage nodes;

validating, by the first service, the request;

transmitting, by a second service of the distributed data storage system, a message to the first service to obtain data that is associated with the one or more router nodes and the one or more data storage nodes;

receiving, by the second service, the data from the first service, wherein the second service obtains the data by the first service accessing an inventory database that stores an association between the one or more router nodes and the one or more data storage nodes;

determining, by the second service, the health of the cluster based on the data and based on communicating directly with a service of the one or more router nodes; and in response to a determination that the health of the cluster indicates that at least one of the one or more router nodes or one or more data storage nodes is faulty, causing, by the second service, a modification to at least one of: a topology of the cluster, an operational state of one or more router nodes or data storage nodes, or transitioning the cluster to a failure zone.

10. The distributed data storage system of claim 9, wherein the data comprises a health constraint that is associated with the cluster, a topology that is associated with the cluster, a cluster size constraint, or a namespace that is associated with the cluster.

11. The distributed data storage system of claim 9, wherein determining the health of the cluster comprises receiving a communication from the service of the one or more router nodes indicating that the cluster comprises a faulty router node.

12. The distributed data storage system of claim 9, wherein determining the health of the cluster comprises receiving a communication from the service of the one or more router nodes indicating that the cluster comprises a faulty data node.

13. The distributed data storage system of claim 9, wherein the operations further comprise transmitting, by the second service, the health of the cluster to the first service, wherein in response to receiving the health of the cluster, the first service updates a database comprising the data that is associated with the cluster, with the health of the cluster.

14. The distributed data storage system of claim 9, wherein causing the modification comprises transitioning the cluster to the failure zone.

15. The distributed data storage system of claim 9, wherein the operations further comprise in response to determining that the health of the cluster is associated with a fault, designating a new failure zone for the cluster.

16. One or more non-transitory computer readable storage media having instructions stored thereupon which, when executed by a distributed data storage system having at least a processor and a memory therein, cause the distributed data storage system to perform operations comprising:

receiving, by a first service of the distributed data storage system, a request associated with a health of a cluster that comprises one or more router nodes and one or more data storage nodes;

validating, by the first service, the request;

transmitting, by a second service of the distributed data storage system, a message to the first service to obtain data that is associated with the one or more router nodes and the one or more data storage nodes;

receiving, by the second service, the data from the first service, wherein the second service obtains the data by the first service accessing an inventory database that stores an association between the one or more router nodes and the one or more data storage nodes;

determining, by the second service, the health of the cluster based on the data and based on communicating directly with a service of the one or more router nodes; and in response to a determination that the health of the cluster indicates that at least one of the one or more router nodes or one or more data storage nodes is faulty, causing, by the second service, a modification to at least one of: a topology of the cluster, an operational state of one or more router nodes or data storage nodes, or transitioning the cluster to a failure zone.

17. The one or more non-transitory computer readable storage media of claim 16, wherein the data comprises a health constraint that is associated with the cluster, a topology that is associated with the cluster, a cluster size constraint, or a namespace that is associated with the cluster.

18. The one or more non-transitory computer readable storage media of claim 16, wherein determining the health of the cluster comprises receiving a communication from the service of the one or more router nodes indicating that the cluster comprises a faulty router node.

19. The one or more non-transitory computer readable storage media of claim 16, wherein determining the health of the cluster comprises receiving a communication from the service of the one or more router nodes indicating that the cluster comprises a faulty data node.

20. The one or more non-transitory computer readable storage media of claim 16, wherein the operations further comprise transmitting, by the second service, the health of the cluster to the first service, wherein in response to receiving the health of the cluster, the first service updates a database comprising the data that is associated with the cluster, with the health of the cluster.

* * * * *